US011899469B2

(12) United States Patent
Bageshwar et al.

(10) Patent No.: US 11,899,469 B2
(45) Date of Patent: Feb. 13, 2024

(54) METHOD AND SYSTEM OF INTEGRITY MONITORING FOR VISUAL ODOMETRY

(71) Applicant: Honeywell International Inc., Charlotte, NC (US)

(72) Inventors: Vibhor L Bageshwar, Rosemount, MN (US); Xiao Cao, Shanghai (CN); Yawei Zhai, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 354 days.

(21) Appl. No.: 17/410,483

(22) Filed: Aug. 24, 2021

(65) Prior Publication Data
US 2023/0062898 A1   Mar. 2, 2023

(51) Int. Cl.
*G05D 1/02* (2020.01)
*G06T 7/246* (2017.01)
*G06V 20/56* (2022.01)

(52) U.S. Cl.
CPC ......... *G05D 1/0253* (2013.01); *G05D 1/0251* (2013.01); *G06T 7/246* (2017.01); *G06V 20/56* (2022.01); *G06T 2207/10028* (2013.01)

(58) Field of Classification Search
CPC ............... G05D 1/0251; G05D 1/0253; G06T 2207/10028; G06T 2207/20228; G06T 7/246; G06T 7/73; G06V 20/56
See application file for complete search history.

(56) References Cited

U.S. PATENT DOCUMENTS

| 8,213,706 B2 | 7/2012 | Krishnaswamy et al. |
| 9,449,397 B2 | 9/2016 | Chang et al. |

(Continued)

FOREIGN PATENT DOCUMENTS

| CN | 104121902 B | 1/2017 |
| CN | 109741372 A | 5/2019 |

(Continued)

OTHER PUBLICATIONS

Geiger et al: "StereoScan: Dense 3d reconstruction in real-time", 2011 (Year: 2011).*

(Continued)

*Primary Examiner* — Ruiping Li
(74) *Attorney, Agent, or Firm* — Fogg & Powers LLC (57) ABSTRACT

A method of integrity monitoring for visual odometry comprises capturing a first image at a first time epoch with stereo vision sensors, capturing a second image at a second time epoch, and extracting features from the images. A temporal feature matching process is performed to match the extracted features, using a feature mismatching limiting discriminator. A range, or depth, recovery process is performed to provide stereo feature matching between two images taken by the stereo vision sensors at the same time epoch, using a range error limiting discriminator. An outlier rejection process is performed using a modified RANSAC technique to limit feature moving events. Feature error magnitude and fault probabilities are characterized using overbounding Gaussian models. A state vector estimation process with integrity check is performed using solution separation to determine changes in rotation and translation between images, determine error statistics, detect faults, and compute protection level or integrity risk.

20 Claims, 5 Drawing Sheets

(56) References Cited

U.S. PATENT DOCUMENTS

| | | | |
|---|---|---|---|
| 10,366,305 | B2 | 7/2019 | Kayanuma et al. |
| 11,348,269 | B1* | 5/2022 | Ebrahimi Afrouzi ..... G06T 7/33 |
| 2019/0311485 | A1* | 10/2019 | Buczko ..................... G06T 7/97 |
| 2019/0377952 | A1 | 12/2019 | Kim et al. |

FOREIGN PATENT DOCUMENTS

| | | |
|---|---|---|
| CN | 109974743 A | 7/2019 |
| EP | 2093713 A2 | 8/2009 |

OTHER PUBLICATIONS

Kitt et al: "Visual odometry based on stereo image sequences with RANSAC-based outlier rejection scheme", 2010 (Year: 2010).*

De Saxe, "Vision-based trailer pose estimation for articulated vehicles", Department of Engineering, University of Cambridge, dissertation submitted for the degree of Doctor of Philosophy, Sep. 2017, pp. Cover t through 242.

Dias et al., "Accurate stereo Visual Odometry base on keypoint selection", 2019 Latin American Robotics Symposium (LARS), 2019 Brazilian Symposium on Robotics, (SBR) and 2019 Workshop on Robotics in Education (WRE), pp. 74 through 79.

European Patent Office, "Extended European Search Report", from EP Application No. 22189211.0, from Foreign Counterpart to U.S. Appl. No. 17/410,483, dated Mar. 2, 2023, pp. 1 through 9, Published: EP.

Mouats et al, "Multispectral Stereo Odometry", IEEE Transaction on Intelligent Transportation Systems, vol. 16, No. 3, Jun. 2015, pp. 1210 through 1224.

Mouats et al., "Thermal Stereo Odometry for UAVs", IEEE Sensors Journal, vol. 15, No. 11, Nov. 2015, pp. 6335 through 6347.

Fu et al., "Visual odometry errors and fault distinction for integrity monitoring", Aerospace Systems, Sep. 14, 2020, pp. 265 through 274, Shanghai Jiao Tong University, Springer.

Wang et al., "Feature-based visual navigation integrity monitoring for urban autonomous platforms", Aerospace Systems, Jul. 29, 2020, pp. 1 through 14, Shanghai Jiao Tong University, Springer.

* cited by examiner

METHOD AND SYSTEM OF INTEGRITY MONITORING FOR VISUAL ODOMETRY

BACKGROUND

Vision-based or vision-aided navigation systems have attracted wide interest because of their performance indoors, underground, and in urban environments where the Global Navigation Satellite System (GNSS) becomes unavailable. Accordingly, vision aided navigation is one option to estimate vehicle kinematic state statistics in urban safety-critical applications, such as Urban Air Mobility (UAM), Unmanned Aircraft Systems (UAS), and next-generation autonomous vehicle applications.

Vision-based sensing and vision-aided navigation systems will potentially be used as a navigation system for UAM vehicles, UAS, and next-generation autonomous vehicles. For these safety-critical applications, the navigation system must provide safety-assured navigation solutions and must satisfy stringent integrity, continuity, and availability requirements. Integrity is a measure of trust in navigation measurements and vehicle kinematic state statistics estimated by the navigation system and, thus, is an important navigation performance metric in these applications.

Visual odometry is a technique that uses features in the field of view (FOV) of a vision-based sensor over consecutive measurement time epochs to estimate the change in translation and change in rotation of the sensor and, thus, the vehicle to which the sensor is affixed. For vision-aided navigation systems that use visual odometry, the following performance metrics are of interest by users: fault-free measurement statistics including the standard deviations of rotation and translation of a vehicle; protection levels of rotation and translation; and integrity risk. An important aspect of integrity design is to rigorously calculate the integrity risk (or protection level). However, existing approaches have focused more on the accuracy and robustness of measurements computed from visual odometry systems, rather than their errors, integrity, and reliability.

SUMMARY

A method of integrity monitoring for visual odometry is provided. The method comprises capturing a first image of a given area at a first time epoch with at least one set of stereo vision sensors, capturing a second image of the given area at a second time epoch with the stereo vision sensors, and extracting a plurality of features from each of the first and second images. The method performs a temporal feature matching process operative to match the extracted features from the first image at the first time epoch with the extracted features from the second image at the second time epoch. The temporal feature matching process uses a feature mismatching limiting discriminator to reduce a likelihood of feature mismatch, between features in the first and second images, to below a first predetermined threshold. The method performs a range, or depth, recovery process operative to provide stereo feature matching between two images respectively taken by the stereo vision sensors at the same time epoch. The range, or depth, recovery process uses a range error limiting discriminator to limit features having range errors greater than a second predetermined threshold. The method performs an outlier rejection process using a modified random sample consensus (RANSAC) technique operative to limit feature moving events that are greater than a third predetermined threshold. The method characterizes a feature error magnitude and feature fault probabilities using overbounding Gaussian models. Finally, the method performs a state vector estimation process with integrity check using a solution separation technique to determine a change in rotation and a change in translation between the first image and the second image, to determine error statistics of the change in rotation and change in translation between the first image and the second image, to detect any faults, and to compute a protection level or integrity risk.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system of integrity monitoring for visual odometry is described herein. The method and system provide an approach to realize integrity monitoring of vision-aided navigation systems used in various vehicles, such as UAM vehicles, UAS, next-generation autonomous vehicles, and the like.

The present approach provides an integrity framework for visual odometry, which can be employed in vision-aided navigation systems for various vehicles. This integrity framework generally includes: image preprocessing including undistortion and rectification; image feature extraction; image feature matching using a mismatching limiting discriminator; depth recovery using a range error limiting discriminator; outlier rejection using a modified Random Sample Consensus (RANSAC) technique; and state vector estimation with a final integrity check.

The present approach utilizes multiple discriminators to realize integrity monitoring for visual odometry and reduce the integrity risk. The mismatching limiting discriminator is used in the image feature matching to reduce the mismatch rate. The range error limiting discriminator is used in the depth recovery to limit the feature points with large range direction, or z-direction, errors. The modified RANSAC technique discriminator is used to limit feature moving events. The final discriminator can be implemented using a Multiple Hypotheses Solution Separation (MHSS) technique in state vector estimation algorithms to further detect faults and provide protection levels. These discriminators can be integrated into current embedded sensor-fusion software to enhance visual odometry integrity capability.

As used herein, the terms "feature" or "features" refers to information about the content of an image, such as whether a certain region of the image has specific structures (e.g., points, edges, objects, etc.). Non-limiting examples of features in an image can include physical features of terrain, such as landmarks, buildings, roads, or other distinctive terrain features.

Further details of the method and system of integrity monitoring for visual odometry are described as follows and with reference to the drawings.

Figure 1:
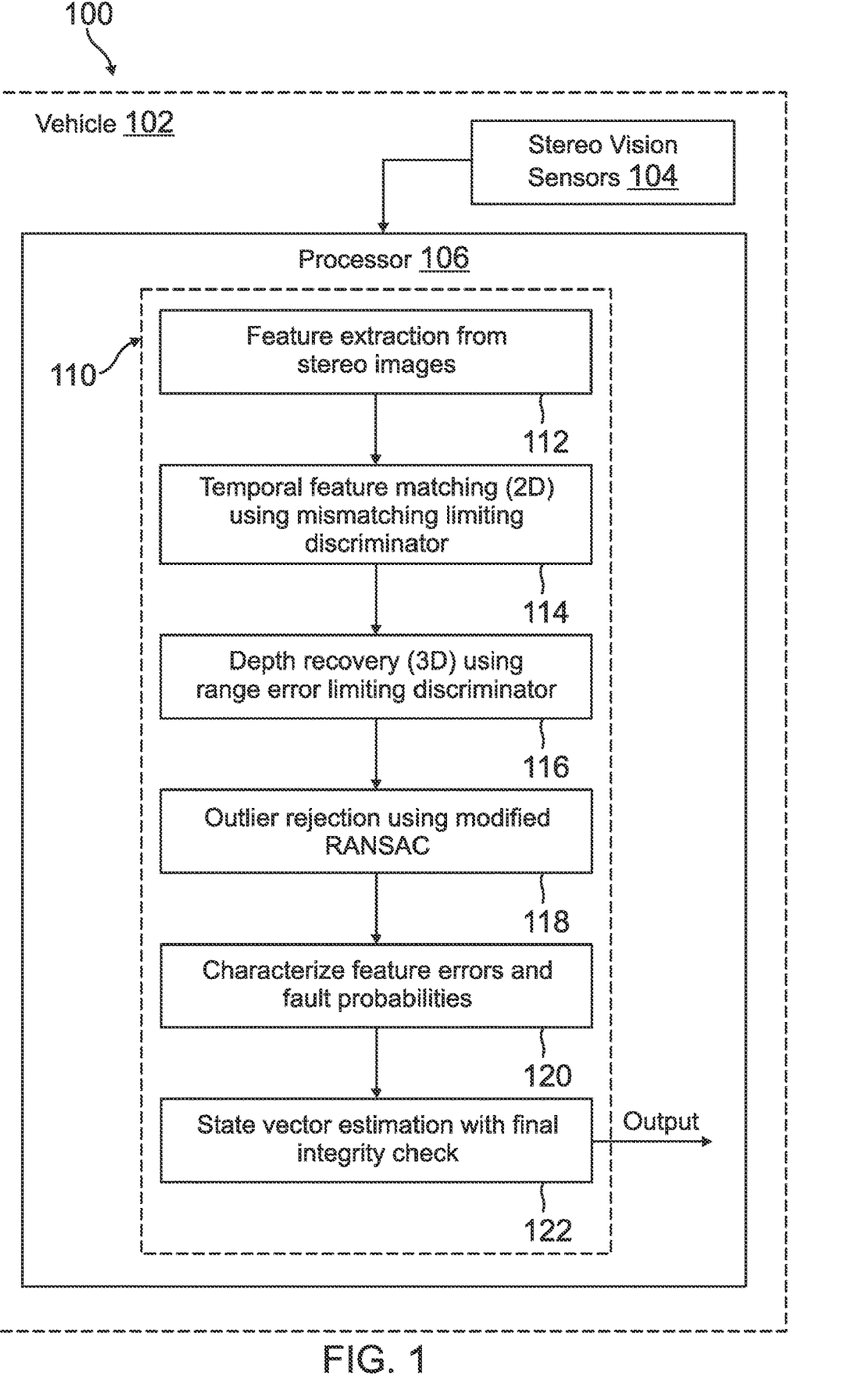
FIG. 1 is a block diagram of a system for integrity monitoring of visual odometry in a vision-aided navigation system for a vehicle, according to an exemplary embodiment.

FIG. 1 is a block diagram of a system 100 for integrity monitoring of visual odometry in vision-aided navigation systems for a vehicle 102, according to an exemplary embodiment. The vehicle 102 can be an UAM vehicle, UAS, next-generation autonomous vehicle, or the like, which employs a vision-aided navigation system. The vehicle 102 has at least one set of stereo vision sensors 104 mounted thereon, such as stereo cameras, which are operative to capture stereo images of the area over which vehicle 102 traverses. The vehicle 102 includes at least one processor 106 operatively coupled to stereo vision sensors 104.

The processor 106 is operative to perform a method 110 of integrity monitoring of the visual odometry performed by the vision-aided navigation system in vehicle 102. The method 110 generally includes the following steps, which are described in further detail hereafter. The method 110 begins with performing feature extraction from the stereo images (block 112), which are captured by the stereo vision sensors 104 while vehicle 102 traverses over a given terrain. The method 110 then performs a two-dimensional (2D) temporal feature matching process using a mismatching limiting discriminator (block 114), which reduces the feature mismatch rate in the stereo images, to below a predetermined threshold. The method 110 then performs a three-dimensional (3D) depth recovery process using a range error limiting discriminator (block 116), which limits features having range errors greater than a predetermined threshold.

Thereafter, method 110 performs an outlier rejection process using a modified random sample consensus (RANSAC) technique (block 118), which is operative to limit feature moving events that are greater than a predetermined threshold. The method 110 then characterizes a feature error magnitude and fault probabilities (block 120), using overbounding Gaussian models. The method 110 then performs a state vector estimation process with a final integrity check (block 122), using a solution separation technique to determine a change in rotation and a change in translation between the stereo images, to detect any faults and compute a protection level or integrity risk. These parameters are then output for use by the vision-aided navigation system of vehicle 102.

Various aspects of the present approach for integrity monitoring of visual odometry are described in further detail as follows.

Visual Odometry Integrity Scheme

Figure 2:
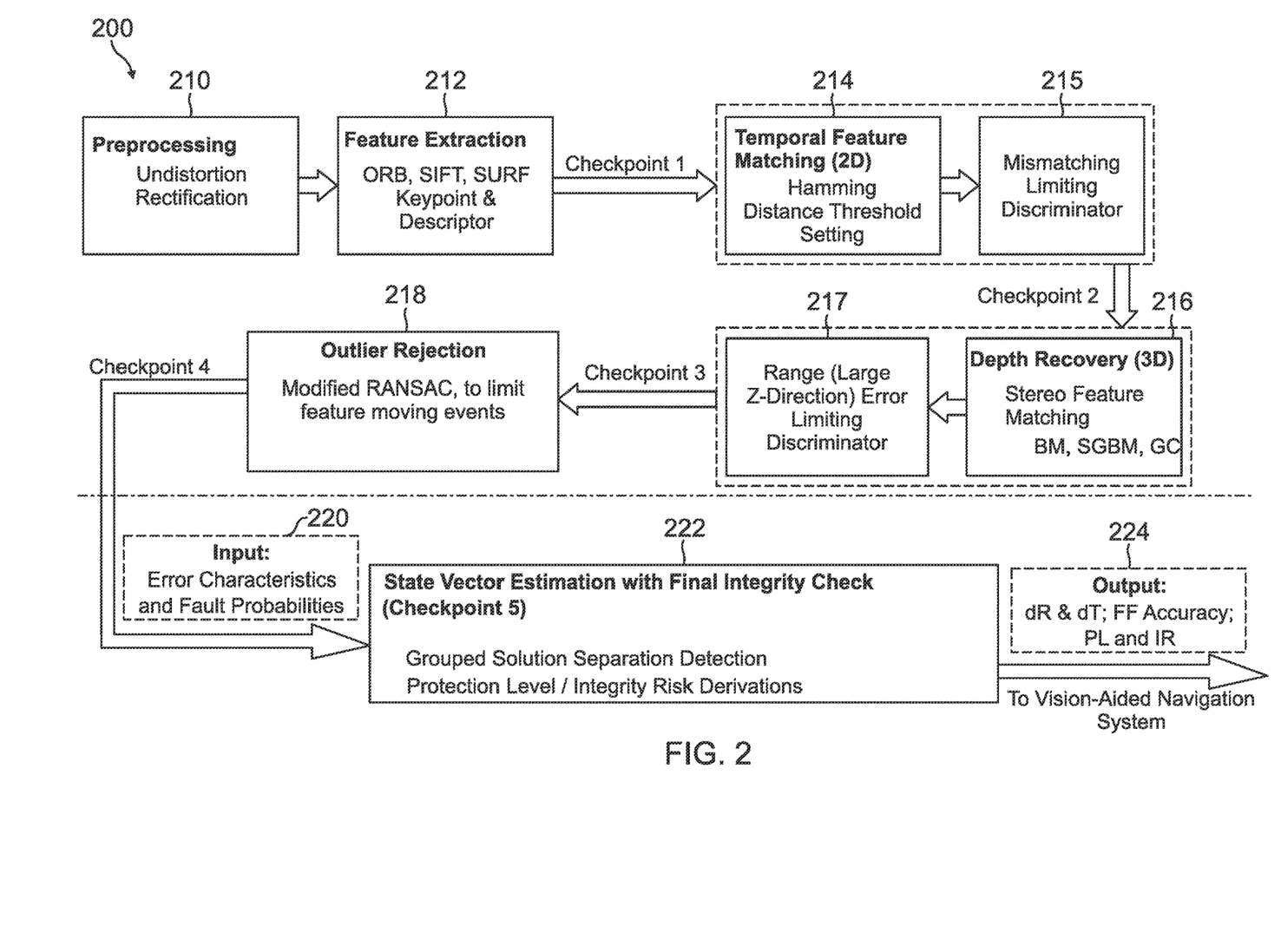
FIG. 2 is a flow diagram of a method for implementing a visual odometry integrity monitoring scheme for use in a vehicle vision-aided navigation system.

FIG. 2 is a flow diagram of a method 200 for implementing the present visual odometry integrity monitoring scheme, which can be employed in a vision-aided navigation system of a vehicle, such as an UAM vehicle, UAS, next-generation autonomous vehicle, or the like. As described above, such a vehicle has stereo vision sensors mounted thereon, which capture stereo images of an area over which the vehicle traverses.

The method 200 starts with a preprocessing step for the stereo images captured by the stereo vision sensors, in which undistortion and rectification of the images is carried out (block 210). The undistortion process corrects a non-linear projection of surface points of objects in the images onto an image plane due to lens distortion. The rectification process is a transformation process used to project multiple images onto a common image surface, and is used to correct a distorted image into a standard coordinate system.

Next, method 200 performs feature extraction from the stereo images (block 212). Various standard techniques can be used for the feature extraction, such as oriented FAST and rotated BRIEF (ORB), scale invariant feature transform (SIFT), speeded up robust feature (SURF), or the like. These techniques can be used to extract a keypoint and compute its associated descriptor for each feature in the images. Accordingly, each feature is fully defined by the respective extracted keypoint and its associated descriptor. At a first checkpoint (checkpoint 1), method 200 determines whether the feature descriptors are correct, and the associated probability.

The method 200 then performs a Temporal Feature Matching (2D) process (block 214), which is operative to match the extracted features from a first image (of the stereo images) at a first measurement time epoch with the extracted features from a second image (of the stereo images) at a second measurement time epoch, using a Hamming distance and threshold setting. As described further hereafter, the temporal feature matching process uses a mismatching limiting discriminator 215 to reduce a mismatch rate, between features in the first and second images, to below a predetermined (mismatch) threshold. The mismatching limiting discriminator 215 is applied at a second checkpoint (checkpoint 2) to determine a probability of correct match (1−likelihood of test failure), and to characterize the magnitude of resulting feature errors.

The method 200 also performs a Depth Recovery (3D) process (block 216), which is operative to provide stereo feature matching between two images respectively taken by the stereo vision sensors at the same time epoch. Stereo feature matching refers to the matching these two images to estimate the depth (range) information of the features in these images. This step is performed at one measurement time epoch, and is independent from the temporal feature matching process (block 214). The stereo feature matching is performed by using standard techniques, such the Boyer-Moore (BM) algorithm, the Semi-Global Block Matching (SGBM) algorithm, the Graph Cut (GC) algorithm, or the like.

The depth recovery process uses a range (large z-direction) error limiting discriminator 217 to limit features having range errors greater than a predetermined threshold. The range error limiting discriminator 217 is applied at a third checkpoint (checkpoint 3). It should be noted that the depth estimation is based on pixel matching, and there may also be faults in this process.

Thereafter, method 200 performs an outlier rejection process using a modified RANSAC technique (block 218), which is operative to limit feature moving events that are greater than a predetermined threshold. The modified RANSAC technique is applied at a fourth checkpoint (checkpoint 4).

The RANSAC method is a traditional and well known approach for outlier rejection, and shows promising performance in visual odometry applications, even when the outlier ratio is high. However, the RANSAC method needs to be extended when applying this method to an integrity scheme, as it must provide an estimate (upper bound) of the probability of outlier rejection. The RANSAC method greatly reduces the outlier fault rate, but integrity requires quantifying this rate because the fault rate is an input of the integrity monitoring scheme. Therefore, the present approach is used as a basis to derive a fault rate estimation method. It should be noted that the fault rate will be dependent on the RANSAC parameters, e.g., the number of iterations and the thresholds. A data-driven method is used to determine the fault rate as a function of the selected RANSAC parameters.

Next, method 200 characterizes feature error magnitude and fault probabilities using overbounding Gaussian models (block 220). The feature error characteristics and feature mismatch fault probabilities are determined by filtering out all the faults, which are caused by mismatching events and dynamic objects observed by the vision sensors, and then examining whether the vision sensor errors are stable under different scenarios. The error modeling can also be used to account for variations caused by complex environments.

The method 200 performs a State Vector Estimation with Final Integrity Check (block 222) at a fifth checkpoint (checkpoint 5), which receives the feature error characteristics and feature mismatch fault probabilities determined in the previous stage (block 220) as an input. As described further hereafter, the fifth checkpoint performs a state vector estimation process, grouped solution separation detection such as by the MHSS technique, and protection level and integrity risk derivations. The MHSS technique is well-known and can identify faults in both single-fault cases and multiple-faults cases. Solution separation is used to determine a change in rotation (dR) and a change in translation (dT) between the first image and the second image; detect any faults and determine a fault-free (FF) accuracy level for dR and dT; and compute a protection level (PL) or integrity risk (IR). These parameters are then output (block 224) for use by the vision-aided navigation system of the vehicle.

As indicated by FIG. 2, matched image features are the direct vision sensor measurements for visual odometry, by which the navigation measurements (i.e., dR and dT) are derived using state vector estimation methods. Without using RANSAC and using the multiple discriminators, the feature matching outlier rate, or feature mismatch rate, can be approximately 10% depending on the scenario. However, for integrity monitoring techniques such as MHSS, this likelihood results in a large number of feature subsets to monitor resulting in high computational demand. Nevertheless, if the multiple discriminators are used in combination with RANSAC, then the feature matching outlier rate drops and reduces the number of feature subsets used by integrity monitoring techniques.

Sources of visual odometry errors can be classified into several categories: feature mismatches, moving objects, and sensor measurement errors where feature mismatches and moving objects are considered as faults. Currently, the user must pre-select the bounds of the discriminators in existing algorithms to provide required feature error characteristics and feature match fault probabilities for every specific application. The measurement errors can be roughly divided into propagation errors and camera measurement errors. Propagation errors are caused by non-linear propagation on the optical path, and camera measurement errors are influenced by the camera's resolution and measurement noise. Therefore, different error models can be developed to accommodate specific camera performance and different air conditions (e.g., humidity).

In one implementation, the feature matching is based on the descriptor of the ORB feature. If there are two features in two images with a similar descriptor, then they are likely to correspond to the same point within the sensor's field of view. The present approach modifies the traditional descriptor-based matching strategy, to reduce the probability of feature mismatching and reduce the sensitivity of the feature mismatching rate to the vehicle's operating environment. A similarity measure can be introduced to identify the potential feature mismatching events before the feature matching process begins.

Figure 3:
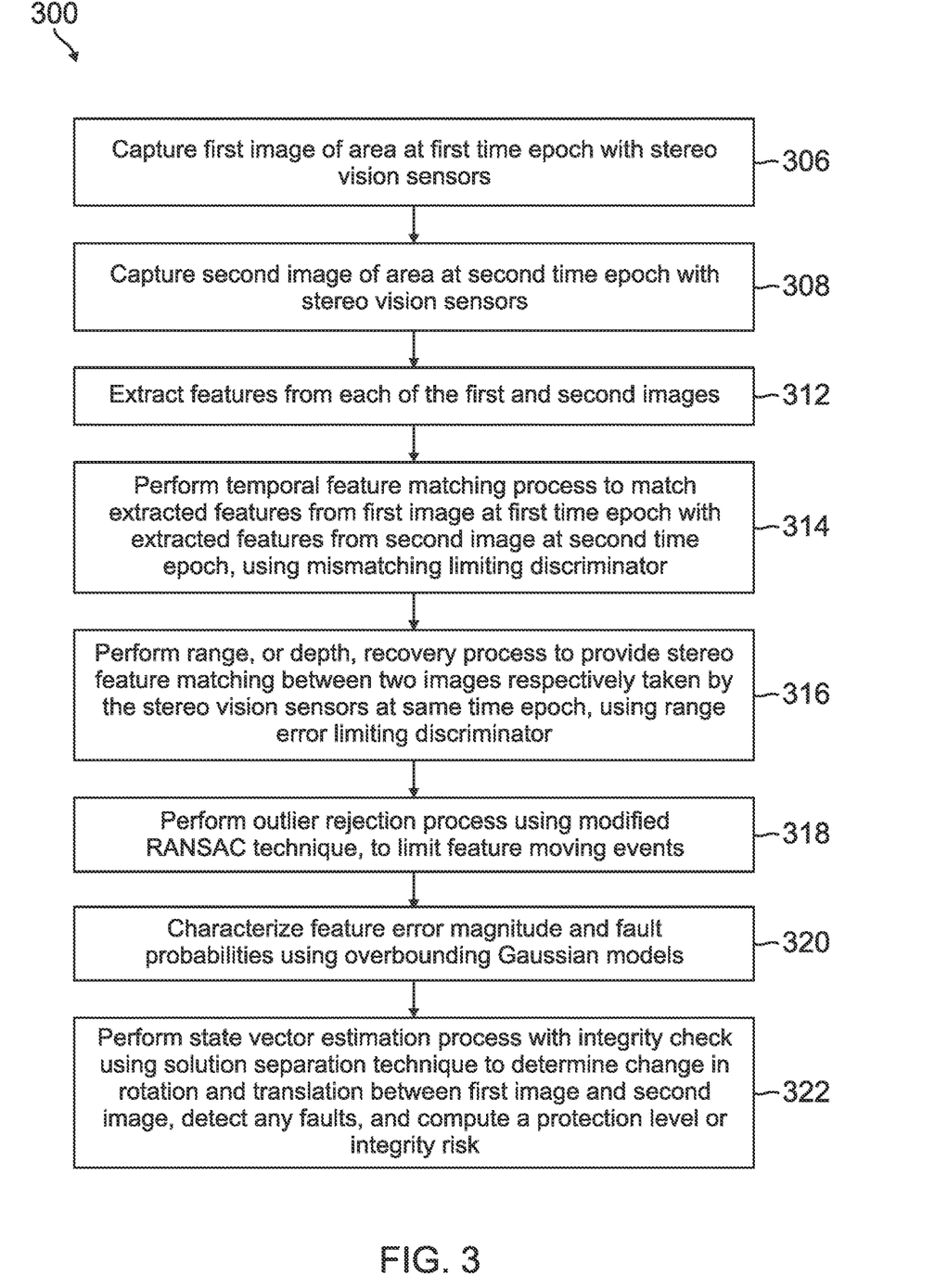
FIG. 3 is a flow diagram of a method that applies a visual odometry integrity monitoring scheme for use in a vision-aided navigation system for a vehicle.

FIG. 3 is a flow diagram of a method 300, which applies the visual odometry integrity monitoring scheme described above for use in a vision-aided navigation system of a vehicle, such as an UAM vehicle, UAS, next-generation autonomous vehicle, or the like. As described above, such vehicles are equipped with stereo vision sensors, such as stereo cameras, which capture stereo images of an area over which the vehicle traverses.

Initially, the stereo vision sensors capture a first image of a given area at a first time epoch (block 306), and capture a second image of the given area at a second time epoch (block 308). The method 300 extracts a plurality of features from each of the first and second images (block 312), such as with a standard image feature extraction technique as described above. The method 300 then performs the temporal feature matching process, which is operative to match the extracted features from the first image at the first time epoch with the extracted features from the second image at the second time epoch (block 314). As described above, the temporal feature matching process uses a mismatching limiting discriminator to reduce a feature mismatch rate, between features in the first and second images, to below a user-selected threshold. The method 300 also performs the depth recovery process that is operative to provide stereo feature matching between two images respectively taken by the stereo vision sensors at the same time epoch (block 316). As described above, the depth recovery process uses a range error limiting discriminator to limit features having range errors greater than a user-selected threshold.

The method 300 then performs the outlier rejection process using the modified RANSAC technique, which is operative to limit feature moving events that are greater than a user-selected threshold (block 318). Thereafter, method 300 characterizes feature error magnitude and feature matching fault probabilities using overbounding Gaussian models (block 320). The method 300 then performs the state vector estimation process with integrity check, using the solution separation technique as described above, to determine a change in rotation and a change in translation between the first image and the second image, to detect any faults, and compute a protection level or integrity risk (block 322). These parameters are then output for use by the vision-aided navigation system of the vehicle.

As described previously, various discriminators are applied in the visual odometry integrity scheme. The mismatching limiting discriminator is used to limit mismatching events and, thus, the mismatch rate. The range error limiting discriminator is used to limit the feature points with large z-direction errors. The modified RANSAC technique discriminator is used to limit features with motion and is the first discriminator layer for outlier rejection. The MHSS technique is the second discriminator layer for further fault detection and protection level derivation. Various discriminators are described in further detail as follows.

Mismatching Limiting Discriminator

As described above, one implementation of feature extraction and matching is based on the ORB technique, which is both computationally efficient and robust to some disturbances. In the present approach, some modifications have been made to the baseline technique to reduce the feature mismatching rate. First, the basic principles of ORB-based feature matching can be described as follows. Certain features are extracted from an image, each of which is composed of two attributes: (1) the location of a key pixel, and (2) a descriptor that describes the features of the key pixel and its surrounding pixels. The matching process is based on the descriptor. To be more specific, if two features from two images have similar descriptors, then they are likely to correspond to the same point within the sensor's field of view. If there is no distortion in the generation process of the images, then the same point in the sensor's field of view will form two features with the same descriptor. However, due to complex distortions, such as illumination changes and different perspectives, the descriptors will not be exactly the same. Therefore, in typical applications, a threshold (usually selected as a Hamming distance) is selected during the matching process. If the difference between two descriptors is below the threshold, then the two corresponding features are matched with each other.

Feature matching becomes more difficult if two or more features from the same image have similar descriptors. This situation can occur in scenarios where there are similar objects (e.g., similar cars, similar buildings), repetitive textures, or weather conditions. There is a high risk of feature mismatch in these scenarios because it is difficult to distinguish between different features. This visual similarity of objects within the sensor's field of view is the main cause of mismatching events.

Figure 4A:
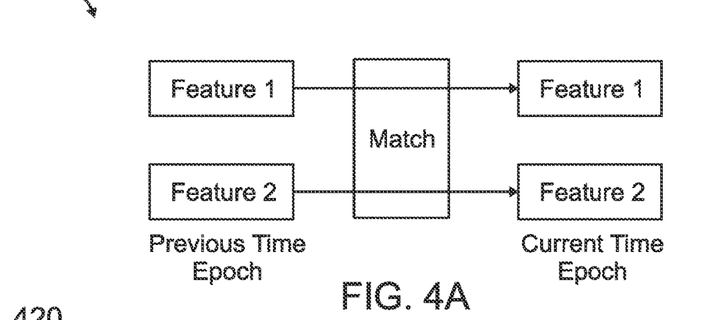
FIGS. 4A and 4B are schematic diagrams that respectively illustrate an image feature matching event, and an image feature mismatching event.
Figure 4B:
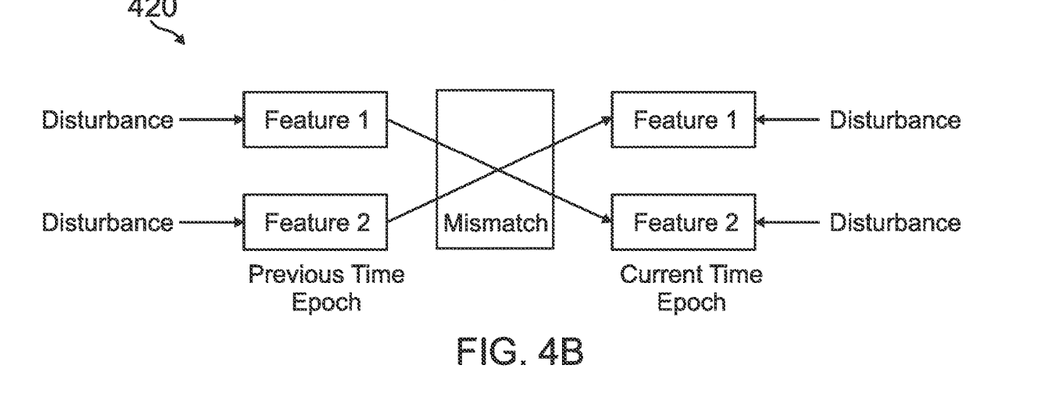

FIGS. 4A and 4B are schematic diagrams that, respectively, illustrate an image feature matching event and an image feature mismatching event. As shown in FIG. 4A, during a feature matching event 410, Feature 1 in the image from the previous time epoch will be matched with Feature 1 in the image from the current time epoch, and Feature 2 in the image from the previous time epoch will be matched with Feature 2 in the image from the current time epoch. As shown in FIG. 4B, during a feature mismatching event 420, if Feature 1 and Feature 2 have similar descriptors, and there are disturbances while the sensor is capturing images, Feature 1 in the image from the previous time epoch may be matched with Feature 2 in the image from the current time epoch, and Feature 2 in the image from the previous time epoch may be matched with Feature 1 in the image from the current time epoch, which constitutes feature mismatching events.

The mismatching limiting discriminator is designed to minimize the effect of different features with small Hamming distances on the feature mismatch rate. This discriminator does not match features whose descriptor is similar to another feature in the same image as confirmed by the Hamming distance. In particular, feature matching is not performed during the traditional feature matching step. Instead, a distance residual-based matching process is applied to match features after the RANSAC step. That is, following the RANSAC step, this process uses the distance residuals of these features with each possible matching result. The two features with the smallest distance residual has a higher probability of being a feature match as compared to simply using the Hamming distance of the feature descriptors. By using this process, the likelihood of feature mismatch can be greatly reduced.

Figure 5:
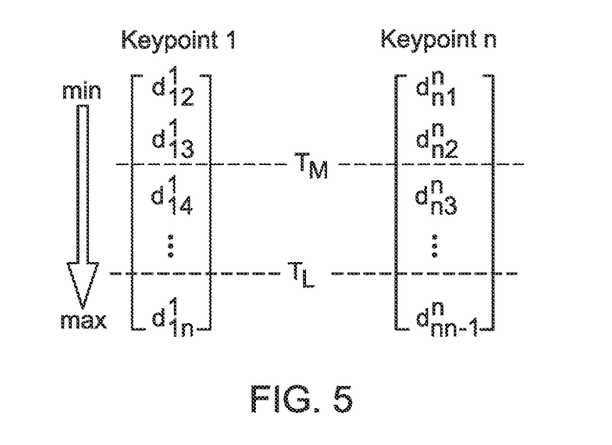
FIG. 5 is a schematic diagram of the function of a mismatching limiting discriminator employed in a method for integrity monitoring of visual odometry, according to one example.

In a conventional feature matching process, the Hamming distance (d) of all the descriptors of the keypoints between features is computed, the pairs of features with a d below a user selected threshold $T_L$ are matched, whereas those pairs of features with a d above the user selected threshold $T_L$ are removed because they are considered to be feature mismatches. The mismatching limiting discriminator augments this process and is operative to additionally identify features with a small Hamming distance using a threshold $T_M$, where $T_M < T_L$. Feature pairs with Hamming distances less than threshold $T_L$ but greater than threshold $T_M$ are placed into an input dataset for the upcoming RANSAC tests. Feature pairs with Hamming distances less than threshold $T_M$ are placed in an auxiliary dataset for further testing. This is illustrated in the example shown in FIG. 5, where the Hamming distance for a first keypoint (Keypoint 1) between features is computed and organized from a minimum to a maximum, as $d_{12}^1, d_{13}^1, d_{14}^1 \ldots d_{1n}^1$. The Hamming distance for one or more additional keypoints (Keypoint n) is computed and organized from a minimum to a maximum, as $d_{n1}'', d_{n2}'', d_{n3}'' \ldots d_{nn-1}''$. As shown in FIG. 5, this process only keeps those feature matches whose keypoints have Hamming distances that are less than $T_L$. Feature matches whose keypoints have Hamming distances that are less $T_M$ are kept for residual matching following the RANSAC step. The threshold settings $T_L$ and $T_M$, are user-selected.

Outlier Rejection Scheme

The RANSAC algorithm is a technique to estimate parameters of a model by random sampling of observed data. Given a dataset whose elements contain both inliers and outliers, the RANSAC algorithm uses a voting scheme to find the optimal set of model parameters that fit the dataset. Elements in the dataset are used to vote for one or multiple models. The implementation of this voting scheme is based on two assumptions: 1) that the statistics of the noisy features will not allow RANSAC to consistently vote for any single model (limited outliers); and 2) that there are sufficient features to agree on a good model (limited missing data).

The RANSAC algorithm essentially includes two steps that are iteratively repeated. In the first step, a subset containing elements of the input dataset is randomly selected. A model and its corresponding parameters are fit and computed using only the elements of this subset. The cardinality of the subset is the smallest sufficient to determine the model and its parameters. In the second step, the RANSAC algorithm checks which remaining elements of the input dataset are consistent with the model and its parameters determined from the first step. An element will be considered as an outlier if it is inconsistent with the model and its parameters determined in the first step within some error threshold that defines the maximum deviation attributable to the effect of noise.

The elements of the input dataset consistent with the model and its parameters are considered as the set of inliers and this set is called the consensus set. The two steps above are repeated for a fixed number of iterations, with each iteration producing either a model that is rejected because there are too few elements as part of the consensus set, or a refined model together with a corresponding consensus set with a satisfactory number of elements. In the latter case, the refined model is retained if the number of elements of its consensus set is larger than the number of elements of the consensus set corresponding to the previously saved model.

In the implementation of the present modified RANSAC algorithm, there are two important parameters that highly influence the results: the threshold to determine whether an input dataset element is an inlier, and the number of iterations. Also, as mentioned above, as the features in the auxiliary dataset are not used in the modified RANSAC algorithm, the present method needs to match these features based on their distance residuals to the features in the consensus dataset, i.e., using all the inliers. If the distance residual of a feature contained within the auxiliary dataset is less than a user selected distance threshold, then this feature is added to the consensus dataset. Feature matches with the smallest residuals are regarded as the best matches. While these modified tests minimize the likelihood of a false feature match, there remains the possibility of a feature mismatch, but such feature mismatches will be identified in the next discriminator.

Integrity Embedded Visual Odometry Measurement Estimation

The final step in the process is to determine navigation measurements (i.e., dR and dT) using state vector estimation methods. The State Vector Estimation with Final Integrity Check (block 222, FIG. 2) uses an iterative least squares (LS) based state vector estimation algorithm to estimate dR, dT and their associated real-time error statistics. The LS based state vector estimation algorithm is coupled with an integrity monitoring framework which is based on the real-time error statistics of dR and dT. This integrity monitoring framework includes a two-step fault detection scheme, which employs both modified RANSAC and MHSS to achieve both high efficiency and high reliability. In the first step, the modified RANSAC algorithm was used to identify a minimal set of feature matching pairs based on feature descriptors and residual distances between feature pairs. In the second step described below, MHSS uses combinations of the feature matches to determine the probabilistic error bound on dR and dT that captures the undetected faults and the measurement uncertainty, and to assess measurement integrity.

As mentioned previously, feature-based vision-aided navigation systems occasionally encounter measurement faults that threaten the vehicle's operational safety. The present approach leverages the concept of integrity into the vision-aided navigation context and develops a corresponding integrity monitoring framework. This framework can detect and exclude misleading feature matches, and can also determine the probabilistic error bound of the measurements dR and dT. The framework requires some essential inputs to ensure its reliability, including measurement error models, prior fault probabilities, and pre-defined navigation performance requirements. These essential inputs include target integrity risk and continuity risk, which are known to those skilled in the art.

In urban environments, the vision sensors can potentially provide a large number of features, and there is potential for a large likelihood of feature mismatches. The safety of the vision-aided navigation system cannot be guaranteed using only the RANSAC algorithms. First, low-probability events and their effect on the dR and dT measurement still need to be monitored. Second, although the modified RANSAC algorithm significantly reduces the likelihood of false feature matches, the probabilistic error bounds on dR and dT still need to be computed to assure the integrity of these measurements.

The MHSS technique is implemented as the integrity monitoring algorithm because it offers two significant advantages. First, it can detect and exclude multiple simultaneous faults; and second, parameters to support integrity arguments are directly computed by this technique.

The MHSS technique realizes the detection of both single and multiple faults through establishing a list of feature subsets, each of which corresponds to a fault mode. Therefore, the first step is to determine the fault modes and corresponding feature subsets that need to be monitored and the associated fault probabilities. Detailed implementation of this step is provided in the Advanced Receiver Autonomous Integrity Monitoring (ARAIM) baseline algorithm, and the outputs include: the monitored subsets (indexed by $j=0, 1, \ldots, N_s$), the maximum number $N_{f,max}$ of simultaneous faults that need monitoring, the fault probability $p_{f_s}^{(j)}$ of each subset, and the total integrity risk $p_{nm}$ arising from the unmonitored fault modes.

The discriminators and thresholds for MHSS are computed by comparing the estimates of dR and dT using all features that pass the modified RANSAC test to the estimates of dR and dT using features in the monitored subsets. For each fault mode, there are six threshold tests in total, one for each dimension of dR and dT. If any one of the six discriminators exceeds the corresponding threshold, then that feature subset is not used in the computation of dR and dT.

Figure 6:
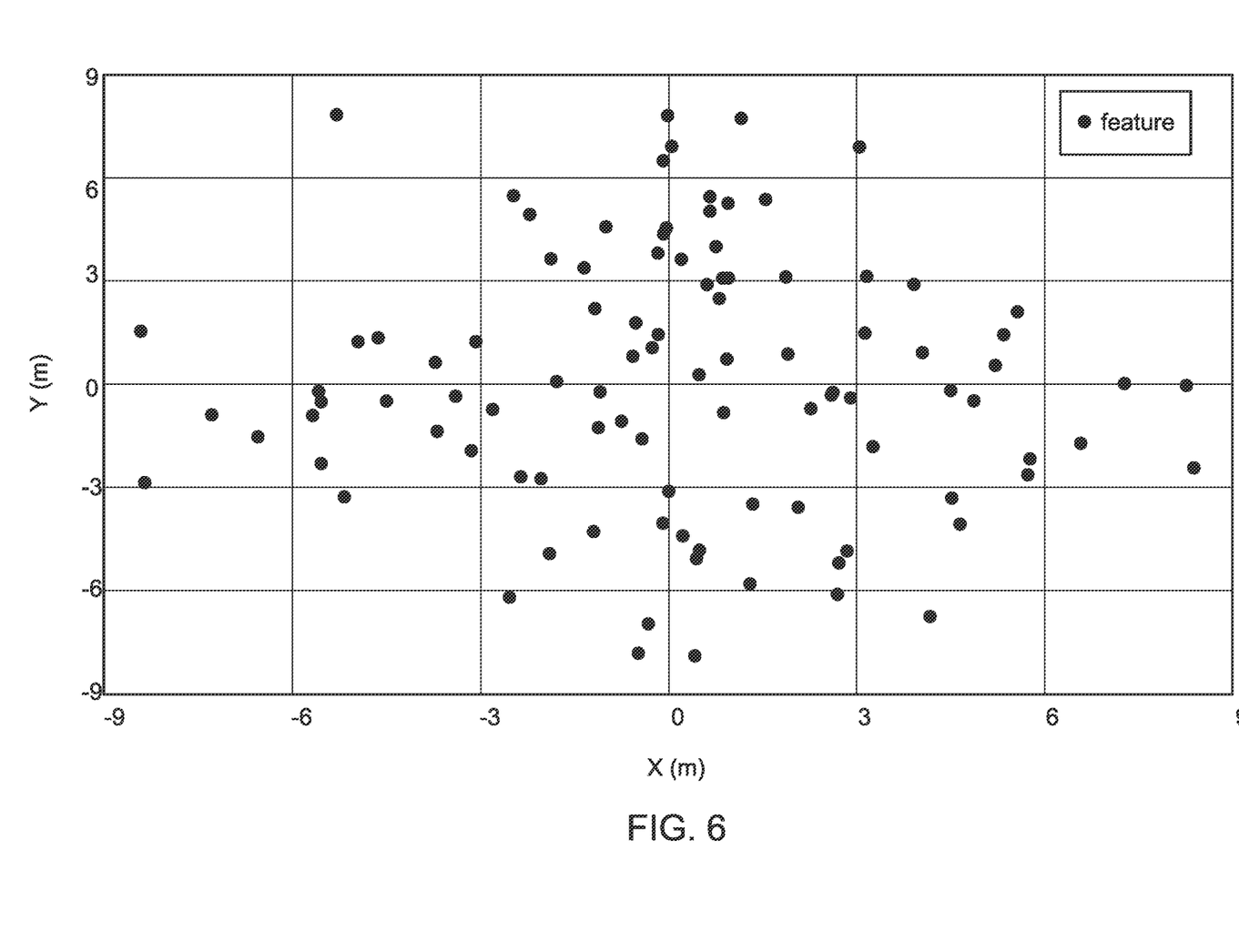
FIG. 6 is a graphical representation of a two-dimensional image example, which is divided into several non-overlapping zones that each include one or more features.

For applications on vehicles with limited computational resources, the algorithm complexity must be taken into consideration. From this perspective, the scheme above may be computationally expensive due to the large number of feature measurements. To address this issue, the present approach uses a technique called "fault grouping" that can greatly reduce the number of monitored subsets. The basic idea of this technique is to divide the image into several non-overlapping zones, called superpixels, each of which includes a group of features. FIG. 6 is a graphical representation that illustrates the generation of superpixels by using a 2D image example. FIG. 6 shows sensor image segmentation, with each rectangle corresponding to an individual superpixel having one or more features.

In the first step of MHSS, i.e., the determination of feature subsets, each superpixel is regarded as an individual measurement. The prior fault probability of the superpixel, which represents the probability of any feature in it being faulted, is given by the following expression:

$$p_{sp} = 1-(1-p_f)^{n_p}$$

where $p_f$ and $p_{sp}$ denote the prior fault probability of each feature and each superpixel, respectively; and $n_p$ is the number of features in this superpixel. In the last step of MHSS, i.e., the computation of protection levels, the protection levels for dR and dT are computed using the error probabilities of dR and dT using all the features, the superpixels, and their separation statistics, as known to those skilled in the art.

The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the navigation system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a method of integrity monitoring for visual odometry, the method comprising: capturing a first image of a given area at a first time epoch with at least one set of stereo vision sensors; capturing a second image of the given area at a second time epoch with the stereo vision sensors; extracting a plurality of features from each of the first and second images; performing a temporal feature matching process operative to match the extracted features from the first image at the first time epoch with the extracted features from the second image at the second time epoch, wherein the temporal feature matching process uses a feature mismatching limiting discriminator to reduce a likelihood of feature mismatch, between features in the first and second images, to below a first predetermined threshold; performing a range, or depth, recovery process operative to provide stereo feature matching between two images respectively taken by the stereo vision sensors at the same time epoch, wherein the range, or depth, recovery process uses a range error limiting discriminator to limit features having range errors greater than a second predetermined threshold; performing an outlier rejection process using a modified random sample consensus (RANSAC) technique operative to limit feature moving events that are greater than a third predetermined threshold; characterizing a feature error magnitude and feature fault probabilities using overbounding Gaussian models; and performing a state vector estimation process with integrity check using a solution separation technique to determine a change in rotation and a change in translation between the first image and the second image, to determine error statistics of the change in rotation and the change in translation between the first image and the second image, to detect any faults, and to compute a protection level or integrity risk.

Example 2 includes the method of Example 1, wherein extracting the plurality of features comprises: extracting a keypoint and computing its associated descriptor for each feature in the first and second images.

Example 3 includes the method of any of Example 1-2, wherein extracting the plurality of features is carried out by a technique comprising: oriented FAST and rotated BRIEF (ORB), scale invariant feature transform (SIFT), or speeded up robust feature (SURF).

Example 4 includes the method of any of Examples 1-3, wherein the temporal feature matching process is a two-dimensional (2D) process that matches the extracted features from the first image at the first time epoch with the extracted features from the second image at the second time epoch, using a Hamming distance and threshold setting.

Example 5 includes the method of Example 4, wherein the mismatching limiting discriminator is operative to exclude keypoints with a smaller Hamming distance distinction, such that only those keypoints with a Hamming distance between predetermined thresholds are initially kept.

Example 6 includes the method of any of Examples 1-5, wherein the range, or depth, recovery process is a three-dimensional (3D) process that performs the stereo feature matching at one time epoch, and is operative to match the two images to obtain range, or depth, information of the features in the images.

Example 7 includes the method of any of Examples 1-6, wherein the range error limiting discriminator is operative to exclude image features having range, or z-direction, errors greater than the second predetermined threshold.

Example 8 includes the method of any of Examples 1-7, wherein the stereo feature matching is performed by a technique comprising: Boyer-Moore (BM), semi-global block matching (SGBM), or graph cut (GC).

Example 9 includes the method of any of Examples 1-8, wherein the modified RANSAC technique is operative to determine a feature matching fault rate using a data-driven method.

Example 10 includes the method of any of Examples 1-9, wherein characterizing the feature error magnitude and fault probabilities is carried out by filtering out all faults, which are caused by feature mismatching events and dynamic objects, and then examining whether sensor measurement errors are stable under different scenarios.

Example 11 includes the method of any of Examples 1-10, wherein the state vector estimation process with integrity check is based on measurement error models, prior fault probabilities, and pre-defined navigation performance requirements.

Example 12 includes the method of any of Examples 1-11, wherein the solution separation technique comprises a multiple hypotheses solution separation (MHSS) technique.

Example 13 includes the method of any of Examples 1-12, wherein the stereo vision sensors are mounted on a vehicle and operatively coupled to a vision-aided navigation system on the vehicle.

Example 14 includes the method of Example 13, wherein the vehicle comprises an unmanned aircraft system (UAS), an urban air mobility (UAM) vehicle, or a next-generation autonomous vehicle.

Example 15 includes a system comprising: at least one set of stereo vision sensors onboard a vehicle; and a processer onboard the vehicle, the processor operatively coupled to the stereo vision sensors, the processor operative to perform a method of integrity monitoring for visual odometry, the method comprising; extracting a plurality of features from each of a first image and a second image captured by the stereo vision sensors, wherein the first image is captured at a first time epoch and the second image is captured at a second time epoch; performing a temporal feature matching process operative to match the extracted features from the first image at the first time epoch with the extracted features from the second image at the second time epoch, wherein the temporal feature matching process uses a feature mismatching limiting discriminator to reduce a likelihood of feature mismatch, between features in the first and second images, to below a first predetermined threshold; performing a range, or depth, recovery process operative to provide stereo feature matching between two images respectively taken by the stereo vision sensors at the same time epoch, wherein the range, or depth, recovery process uses a range error limiting discriminator to limit features having range errors greater than a second predetermined threshold; performing an outlier rejection process using a modified random sample consensus (RANSAC) technique operative to limit feature moving events that are greater than a third predetermined threshold; characterizing a feature error magnitude and feature fault probabilities using overbounding Gaussian models; and performing a state vector estimation process with integrity check using a solution separation technique to determine a change in rotation and a change in translation between the first image and the second image, to determine error statistics of the change in rotation and the change in translation between the first image and the second image, to detect any faults, and to compute a protection level or integrity risk.

Example 16 includes the system of Example 15, wherein extracting the plurality of features comprises: extracting a keypoint and computing its associated descriptor for each feature in the first and second images.

Example 17 includes the system of Example 16, wherein the mismatching limiting discriminator is operative to exclude keypoints with a smaller Hamming distance distinction, such that only those keypoints with a Hamming distance between predetermined thresholds are initially kept.

Example 18 includes the system of any of Examples 15-17, wherein the range error limiting discriminator is operative to exclude image features having range, or z-direction, errors greater than the second predetermined threshold.

Example 19 includes the system of any of Examples 15-18, wherein: the state vector estimation process with integrity check is based on measurement error models, prior fault probabilities, and pre-defined navigation performance requirements; and the solution separation technique comprises a multiple hypotheses solution separation (MHSS) technique.

Example 20 includes the system of any of Examples 15-19, wherein the vehicle comprises an unmanned aircraft system (UAS), an urban air mobility (UAM) vehicle, or a next-generation autonomous vehicle.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method of integrity monitoring for visual odometry, the method comprising:
    capturing a first image of a given area at a first time epoch with at least one set of stereo vision sensors;
    capturing a second image of the given area at a second time epoch with the stereo vision sensors;
    extracting a plurality of features from each of the first and second images;
    performing a temporal feature matching process operative to match the extracted features from the first image at the first time epoch with the extracted features from the second image at the second time epoch, wherein the temporal feature matching process uses a feature mismatching limiting discriminator to reduce a likelihood of feature mismatch, between features in the first and second images, to below a first predetermined threshold;
    performing a range, or depth, recovery process operative to provide stereo feature matching between two images respectively taken by the stereo vision sensors at the same time epoch, wherein the range, or depth, recovery process uses a range error limiting discriminator to limit features having range errors greater than a second predetermined threshold;
    performing an outlier rejection process using a modified random sample consensus (RANSAC) technique operative to limit feature moving events that are greater than a third predetermined threshold;
    characterizing a feature error magnitude and feature fault probabilities using overbounding Gaussian models; and
    performing a state vector estimation process with integrity check using a solution separation technique to determine a change in rotation and a change in translation between the first image and the second image, to determine error statistics of the change in rotation and the change in translation between the first image and the second image, to detect any faults, and to compute a protection level or integrity risk.

2. The method of claim 1, wherein extracting the plurality of features comprises:
    extracting a keypoint and computing its associated descriptor for each feature in the first and second images.

3. The method of claim 2, wherein extracting the plurality of features is carried out by a technique comprising: oriented FAST and rotated BRIEF (ORB), scale invariant feature transform (SIFT), or speeded up robust feature (SURF).

4. The method of claim 2, wherein the temporal feature matching process is a two-dimensional (2D) process that matches the extracted features from the first image at the first time epoch with the extracted features from the second image at the second time epoch, using a Hamming distance and threshold setting.

5. The method of claim 4, wherein the mismatching limiting discriminator is operative to exclude keypoints with a smaller Hamming distance distinction, such that only those keypoints with a Hamming distance between predetermined thresholds are initially kept.

6. The method of claim 1, wherein the range, or depth, recovery process is a three-dimensional (3D) process that performs the stereo feature matching at one time epoch, and is operative to match the two images to obtain range, or depth, information of the features in the images.

7. The method of claim 6, wherein the range error limiting discriminator is operative to exclude image features having range, or z-direction, errors greater than the second predetermined threshold.

8. The method of claim 6, wherein the stereo feature matching is performed by a technique comprising: Boyer-Moore (BM), semi-global block matching (SGBM), or graph cut (GC).

9. The method of claim 1, wherein the modified RANSAC technique is operative to determine a feature matching fault rate using a data-driven method.

10. The method of claim 1, wherein characterizing the feature error magnitude and fault probabilities is carried out by filtering out all faults, which are caused by feature mismatching events and dynamic objects, and then examining whether sensor measurement errors are stable under different scenarios.

11. The method of claim 1, wherein the state vector estimation process with integrity check is based on measurement error models, prior fault probabilities, and pre-defined navigation performance requirements.

12. The method of claim 11, wherein the solution separation technique comprises a multiple hypotheses solution separation (MHSS) technique.

13. The method of claim 1, wherein the stereo vision sensors are mounted on a vehicle and operatively coupled to a vision-aided navigation system on the vehicle.

14. The method of claim 13, wherein the vehicle comprises an unmanned aircraft system (UAS), an urban air mobility (UAM) vehicle, or a next-generation autonomous vehicle.

15. A system comprising:
at least one set of stereo vision sensors onboard a vehicle; and
a processer onboard the vehicle, the processor operatively coupled to the stereo vision sensors, the processor operative to perform a method of integrity monitoring for visual odometry, the method comprising;
extracting a plurality of features from each of a first image and a second image captured by the stereo vision sensors, wherein the first image is captured at a first time epoch and the second image is captured at a second time epoch;
performing a temporal feature matching process operative to match the extracted features from the first image at the first time epoch with the extracted features from the second image at the second time epoch, wherein the temporal feature matching process uses a feature mismatching limiting discriminator to reduce a likelihood of feature mismatch, between features in the first and second images, to below a first predetermined threshold;
performing a range, or depth, recovery process operative to provide stereo feature matching between two images respectively taken by the stereo vision sensors at the same time epoch, wherein the range, or depth, recovery process uses a range error limiting discriminator to limit features having range errors greater than a second predetermined threshold;
performing an outlier rejection process using a modified random sample consensus (RANSAC) technique operative to limit feature moving events that are greater than a third predetermined threshold;
characterizing a feature error magnitude and feature fault probabilities using overbounding Gaussian models; and
performing a state vector estimation process with integrity check using a solution separation technique to determine a change in rotation and a change in translation between the first image and the second image, to determine error statistics of the change in rotation and the change in translation between the first image and the second image, to detect any faults, and to compute a protection level or integrity risk.

16. The system of claim 15, wherein extracting the plurality of features comprises:
extracting a keypoint and computing its associated descriptor for each feature in the first and second images.

17. The system of claim 16, wherein the mismatching limiting discriminator is operative to exclude keypoints with a smaller Hamming distance distinction, such that only those keypoints with a Hamming distance between predetermined thresholds are initially kept.

18. The system of claim 17, wherein the range error limiting discriminator is operative to exclude image features having range, or z-direction, errors greater than the second predetermined threshold.

19. The system of claim 15, wherein:
the state vector estimation process with integrity check is based on measurement error models, prior fault probabilities, and pre-defined navigation performance requirements; and
the solution separation technique comprises a multiple hypotheses solution separation (MHSS) technique.

20. The system of claim 15, wherein the vehicle comprises an unmanned aircraft system (UAS), an urban air mobility (UAM) vehicle, or a next-generation autonomous vehicle.

* * * * *